United States Patent [19]
DuBois

[11] Patent Number: 5,183,636
[45] Date of Patent: Feb. 2, 1993

[54] BRAZE FILLER METAL WITH ENHANCED CORROSION RESISTANCE

[75] Inventor: Samuel C. DuBois, Troy, Mich.

[73] Assignee: Wall Colmonoy Corporation, Madison Heights, Mich.

[21] Appl. No.: 723,943

[22] Filed: Jul. 1, 1991

[51] Int. Cl.$^5$ .............................................. C22C 19/05
[52] U.S. Cl. .................................... 420/442; 420/457
[58] Field of Search ................ 420/442, 457; 148/410, 148/427; 228/263.13

[56] References Cited

U.S. PATENT DOCUMENTS

| | | | |
|---|---|---|---|
| 2,880,086 | 3/1959 | Cape | 420/459 |
| 2,899,302 | 8/1959 | Cape et al. | 420/452 |
| 3,238,060 | 3/1966 | Quaas et al. | 427/423 |
| 3,658,515 | 4/1972 | Saltzman | 420/14 |
| 3,690,849 | 9/1972 | Bredzs et al. | 75/244 |
| 3,836,341 | 9/1974 | Saltzman et al. | 138/145 |
| 4,079,430 | 3/1978 | Fujishima et al. | 360/126 |
| 4,116,682 | 9/1978 | Polk | 148/403 |
| 4,231,793 | 11/1980 | Kruske et al. | 420/453 |
| 4,596,282 | 6/1986 | Maddy et al. | 164/76.1 |
| 4,717,539 | 1/1988 | Morisey | 420/457 |
| 4,731,253 | 3/1988 | DuBois | 427/34 |
| 4,776,862 | 10/1988 | Wiand | 51/293 |

FOREIGN PATENT DOCUMENTS

| | | | |
|---|---|---|---|
| 1193113 | 9/1985 | Canada | 420/442 |
| 241717 | 9/1987 | Czechoslovakia . | |
| 2829702 | 1/1980 | Fed. Rep. of Germany . | |
| 55-82737 | 6/1980 | Japan . | |
| 57-185946 | 11/1982 | Japan . | |
| 59-215448 | 12/1984 | Japan . | |
| 351657 | 10/1972 | U.S.S.R. . | |

OTHER PUBLICATIONS

"Sputtering", by J. A. Thornton and W. Munz, Metals Handbook Ninth Edition, vol. 5 Surface Cleaning, Finishing, and Coating, Aug. 11, 1983, (7 pages).

"High-temperature oxidation behaviour of base metal elements in nickel-base alloys", by K. Wakasa and M. Yamaki, Journal of Materials Science, vol. 23 (1988), pp. 1459-1463.

Colmonoy ® Technical Data Sheet, Wall Colmonoy Corporation, 1988 (4 pages).

Nicrobraz ® Technical Data Sheet, Wall Colmonoy Corporation, 1987 (4 pages).

*Primary Examiner*—R. Dean
*Assistant Examiner*—Margery S. Phipps
*Attorney, Agent, or Firm*—Harness, Dickey & Pierce

[57] ABSTRACT

A novel corrosion inhibiting iron-free filler metal braze composition which has a nominal composition of: from about 5.0% to about 9.0% chromium; from about 3.5% to about 5.5% silicon; from about 2.0% to about 4.0% boron; from about 1.0% to about 6.0% copper; from about 1.0% to about 6.0% molybdenum; from about 1.0% to about 6.0% niobium, tantalum or mixtures thereof and the balance nickel.

7 Claims, 1 Drawing Sheet

BRAZE FILLER METAL WITH ENHANCED CORROSION RESISTANCE

BACKGROUND OF THE INVENTION

The present invention relates to braze filler metal compositions which are iron-free. More specifically, the present invention relates to a braze filler metal which is particularly resistive to corrosion due to tap water sources containing chloride or fluoride ions and the like.

It has been desirable in the past to provide braze filler metals, for corrosion resistant metals such as stainless steel, which are resistant to oxidation and corrosion when utilized in a brazing situation. Thus, brazing filler metals have been successfully developed to resist particularly harsh environments such as sodium hydroxide solutions, sulfuric and nitric acid solutions and the like. Common among such brazing filler metals are nickel based alloys containing iron and chromium. An example of such a filler metal is the Wall Colmonoy Corporation NICROBRAZ® L.M. alloy which has a nominal composition including about 7.0% chromium; 3.0% iron; 3.1% boron; 4.5% silicon; and 0.06% carbon with the balance being nickel.

Some of these prior filler metals while being generally effective have been found to be susceptible to corrosion in tap water and particularly, when hot tap water was used for rinsing parts and the like. Many of these prior filler metals include significant iron content. It is believed that the iron content is problematic in leading to these corrosion problems because during brazing, iron from the base metal may diffuse into the molten braze fillet. After this diffusion the amount of chromium originally provided in the braze filler metal may not be enough to protect the new iron diffused into the braze fillet. Additionally, because the chromium in the braze filler metal and base metals may form chromium carbides during brazing, less chromium is available to protect the iron from corrosion. Thus, it has been a goal in the art to provide an iron-free braze filler metal.

Prior art braze filler metals showed corrosion susceptibility particularly when used at the upper acceptable temperature limits for such braze filler metals. This is believed to be attributable to the enhanced diffusion of iron into the braze metal at the higher temperatures. Additionally, with the lower quality stainless steels, such as 303, 304 and 316, grain enlargement of the base metal occurred during brazing. This is problematic in that grain enlargement will provide a pathway for the undesirable chromium carbide formation at the grain boundaries at the braze filler metal/base metal diffusion layer. Thus, chromium carbide formation at the grain boundaries is undesirable in that the result is again a net loss of chromium available for corrosion protection of the base metal and the braze filler metal.

Even in higher quality stainless steels iron will tend to diffuse into the braze filler metal. This will tend to render the braze metal more sensitive to corrosion. Also even in the higher quality stainless steels, chromium carbides may form in the grain boundaries of the base metal. This again reduces the amount of chromium which is available for corrosion protection of the base metal at the critical grain boundary area.

Thus, it has been a goal in the art to provide an iron-free filler metal composition which is not only corrosion resistant in its composition but will also act to protect the base metal from corrosion susceptibility caused by iron diffusion and chromium carbide formation.

SUMMARY OF THE INVENTION

These problems and goals have been solved and addressed by the iron-free braze filler metal of the present invention which includes as essential components a nickel chromium alloy having copper, molybdenum and niobium as nominal constituents. The copper and molybdenum protect the braze fillet from corrosion even in the presence of diffusion of iron into the braze fillet whereas the niobium constituent tends to diffuse into the stainless steel or other base metal to protect the stainless steel base metal from chromium carbide formation at the braze fillet/base metal diffusion layer. Filler metals made in accordance with the present invention produce good flow characteristics, are not prone to grain enlargement of the base metal and present substantially no corrosion of the braze fillet or at the diffusion layer between the braze alloy and the base metal.

Additional understanding of the present invention, including further benefits and advantages, will become apparent from the subsequent description of the preferred embodiments and the appended claims taken in conjunction with the accompanying drawings and examples.

DESCRIPTION OF THE PREFERRED EMBODIMENTS

Figure 1:
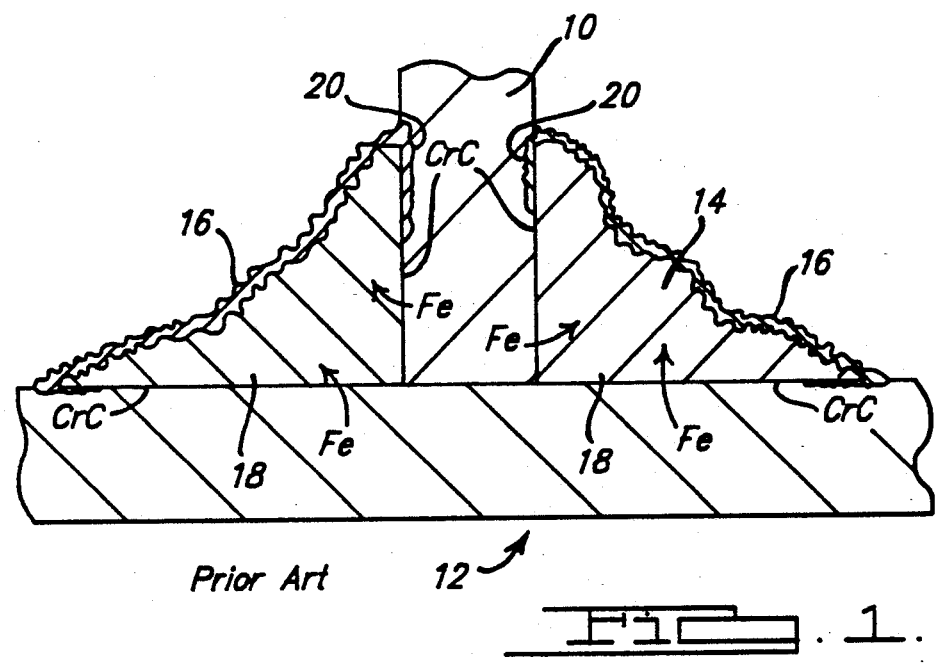
FIG. 1 is a sectional illustrative view showing a conventional braze alloy utilized in a T-joint braze, schematically illustrating the problems of the prior art.

In accordance with the present invention a braze filler metal composition is provided which exhibits corrosion resistance both at the boundary layer between the base metal and the filler metal and in the filler metal fillet. The composition of the present invention is substantially iron-free in its nominal composition.

Compositions of the present invention are nickel based alloys which contain effective amounts of: a) a corrosion inhibiter for protecting the metal forming the final fillet from corrosion due to the diffusion of iron from the base metal into the filler metal fillet during brazing; and b) a diffusing carbide forming base metal protector having a higher affinity for forming carbides than chromium. The carbide forming base metal protector diffuses into the base metal during brazing and preferentially forms carbides which might otherwise form chromium carbides from chromium in the base metal. Thus, chromium carbide formation at the grain boundaries is reduced both in the base metal and at the diffusion layer.

Preferably, the corrosion inhibitors are utilized in amounts of from about 2.0% to about 12.0% and preferably comprise copper, molybdenum and mixtures thereof.

The base metal protector constituent is preferably utilized in amounts of from about 1.0% to about 6.0% and comprise niobium, tantalum or mixtures thereof.

In accordance with the above teachings, preferred embodiments of the present invention include the nominal composition of: from about 5.0% to about 9.0% chromium; from about 3.5% to about 5.5% silicon; from about 2.0% to about 4.0% boron; from about 1.0% to about 6.0% copper; from about 1.0% to about 6.0% of molybdenum; from about 1.0% to about 6.0% niobium, tantalum or mixtures thereof and with the balance being nickel. Preferred filler metal compositions of the present invention will comprise from about 7.0% to about 9.0% chromium; from about 3.5% to about 5.5% silicon; from about 2.0% to about 4.0% boron; from about 2.0% to about 4.0% copper; from about 1.0% to about 3.0% molybdenum; from about 1.0% to about 3.0% niobium, tantalum or mixtures thereof.

As will be readily noted to those skilled in the art, the present alloy is a nickel based alloy. The nickel constituent may be obtained from any number of known sources such as will be appreciated by those skilled in the art. In the present invention it is preferred that a nickel raw material of pure nickel pellets, for instance obtained from INCO International Company, Saddlebrook, N.J. be utilized. However, other suitable pure nickel raw materials such as those available from Falconbridge Parkins of Houston, Tex. may be used. Additionally, part of the nickel constituent of the present invention may be obtained during the addition of nickel containing alloys such as nickel boron or the like during formulation of the braze filler metal of the present invention.

The boron constituent of the present invention is primarily incorporated into the filler metal by additions of nickel boron during manufacture of the present filler metal. Suitable nickel boron compositions include low carbon nickel boron ingot materials which are 18% boron and balance nickel obtained from Shieldalloy Corp., South Holland, Ill. or SKW Metals and Alloys of Niagara Falls, N.Y.

The silicon constituent of the present invention may be incorporated in the present invention by utilization of pure silicon materials obtained from for instance Alchem Metals Company of Marietta, Ohio.

The silicon and boron constituents used in the alloy at the nominal proportions stated above act as fluxing agents and melting point depressants in the alloy compositions of the present invention. These constituents also have a high affinity for oxygen and as such act to protect the other constituents from oxide formation during the brazing process. In addition, the silicon constituent also adds some measure of corrosion resistance to the alloy in its own right.

The chromium constituent of the present invention may be formulated therein by use of pure chromium such as aluminothermic grade chromium. Suitable pure chromium may be obtained from Shieldalloy Corp. of South Holland, Ill.

The copper constituent of the present invention may be formulated therein by utilizing U.S. bronze grade 274 powders which are available through SCM Metal Products of Cleveland, Ohio or U.S. Bronze Corporation of Flemington, N.J.

The molybdenum constituent of the present invention may be formulated in the present alloys by use of pure molybdenum metal nuggets available through Kaichen's Metal Mart of Paramount, Calif.

The pure copper and molybdenum constituents of the filler metals of the present invention are critical in that they are particularly corrosion resistant to halogens and therefore produce the desired corrosion resistant property in the braze itself even if some iron is diffused into the braze material. This allows the filler metals of the present invention to resist corrosion caused by chloride and to a lesser extent fluorides which exist in tap water. Filler metals of the present invention are resistant to tap water whether at ambient temperature or under severe tap water washing conditions of the filler metal, such as ultrasonic washing of brazed structures at elevated temperatures. The copper and molybdenum constituents must be utilized in the percentages cited above because operation outside of these ranges will significantly reduce flowability and other desirable characteristics in the final filler metal alloy when used as a braze material. In particular, the use of the molybdenum constituent outside of the cited ranges would substantially inhibit the flowability characteristics of the filler metal.

Niobium, tantalum or mixtures thereof are also critical in the compositions of the present invention. The niobium or tantalum constituent of the filler metal acts to diffuse into austenitic stainless steel and prevents detrimental chromium carbide formation to protect the base metal from intergrannular corrosion at the diffusion interface between the base metal and the filler metal. Without wishing to be bound by the theory thereof it is believed that niobium and tantalum having a higher affinity than chromium for forming carbides diffuses into the stainless steel base metals and forms niobium or tantalum carbides before undesirable chromium carbides have a chance to form at the diffusion layer. Thus, niobium or tantalum is also beneficial in the braze alloy itself for protecting the chromium constituent therein. Thus, effective amounts of niobium, tantalum or mixtures of the two will be selected such that some of the niobium or tantalum remains in the braze fillet even after diffusion into the base metal. The niobium/tantalum constituent also acts to inhibit grain enlargement in non-stabilized stainless steels which could enhance chromium carbide formation in the grain boundaries at the diffusion layer. The niobium or tantalum may be utilized in pure lump form during the manufacture of the present alloy, and is available from Kaichen's Metal Mart, Paramount, Calif.

Figure 2:
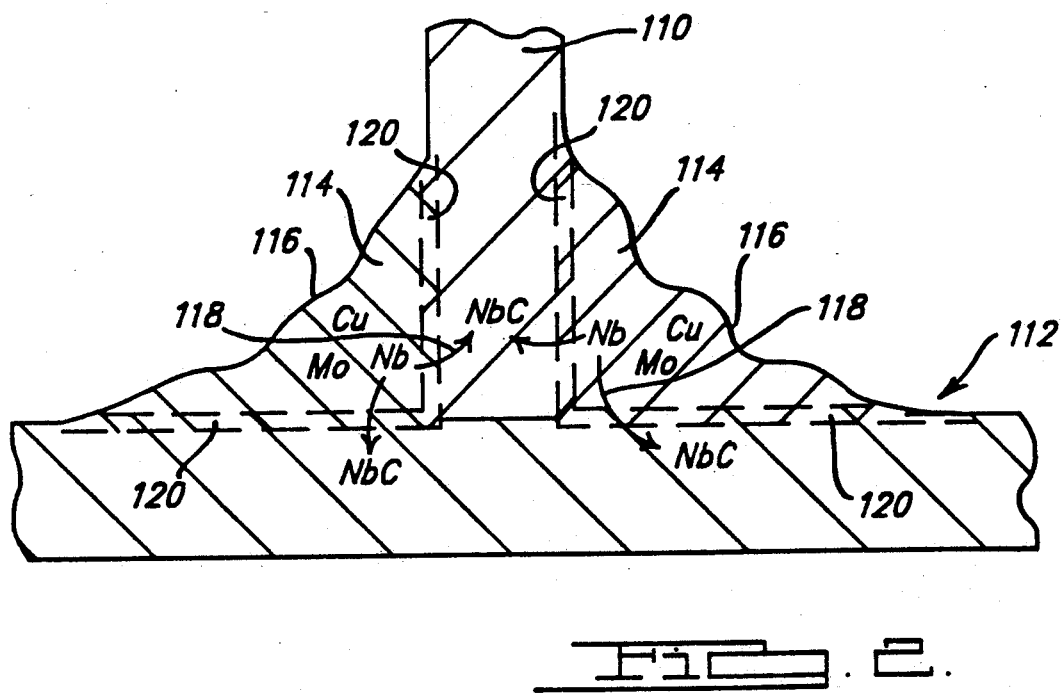
FIG. 2 is a sectional illustrative view of a T-joint braze fillet utilizing the alloys of the present invention schematically illustrating the migration of the niobium into the base metal for protection of the base metal against corrosion.

Referring now to FIGS. 1 and 2, in FIG. 1 there is shown a pair of metal plates 10 and 12 configured in a T-shape which include the filler braze fillet 14. In the prior art, even when using corrosion resistant base metals the surface 16 of the fillet would corrode when exposed to heated tap water. While not wishing to be bound by theory, this is believed to be due to diffusion of iron into the braze during the brazing operation and the unavailability of chromium due to chromium carbide formation at the boundary layer. Such conditions left the braze fillet and diffusion interface somewhat unprotected and susceptible to corrosion. These factors also affected the diffusion interface between the base metal and the filler metal and produced excess corrosion 20 at this diffusion layer 18.

Referring to FIG. 2 a pair of base metal plates 110 and 112 are shown with a fillet of the filler metal of the present invention 114. In the present invention the outer surface 116 of the fillet is protected because of the inclusion of the copper and molybdenum in the alloy which raises the corrosion resistance even if a certain amount of iron diffuses into the alloy during brazing. The present alloy is also protective of the base metal and boundary layer by the diffusion of niobium or tantalum into the base metal alloy (see arrows 118). Thus, the base metal is protected and there is no corrosion found at diffusion layer 120.

In production of the alloys in accordance with the present invention the heat melt order is critical to producing the proper alloy constituents of the present invention. The heat melt order includes first placing the nickel and nickel boron constituents in a suitable furnace crucible and melting the constituents at a suitable temperature of from about 2,260° F. to about 2,400° F. Thereafter, the chrome in lump form is added and alloyed, with some silicon if necessary. The molybdenum is thereafter added and alloyed therein and thereafter copper and niobium are added at the same time to the melt. The silicon is added as the last step in the production of the present filler metals. Once the metal is complete the alloy is atomized at a pressure of about 400 psi at a temperature of from about 2,500° F. to about 2,600° F. for about 26 seconds using a rapid solidification inert gas atomization nozzle.

Further understanding of the present invention will be had by reference to the following examples which are presented herein for purposes of illustration but not limitation.

EXAMPLE I

A filler metal made in accordance with the present invention was accomplished as follows. The constituents set forth in Table I were weighted out.

TABLE I

| Element | Charge % | Weight (gms) | |
|---|---|---|---|
| chromium | 7.9 | 359 | |
| silicon | 4.2 | 191 | |
| boron | 3.2 | 806 | (NiB) |
| copper | 2.5 | 114 | |
| molybdenum | 2.0 | 91 | |
| niobium | 2.0 | 140 | (NiNb) |
| nickel | BALANCE | 2839 | |
| TOTAL | | 4540 | |

An initial melt is provided by first placing ⅓ of the raw nickel composition in a zirconium oxide furnace crucible as a first layer. Secondly, the entire amount of nickel boron is placed as a second layer and thirdly the remaining portion of nickel is utilized to cover and substantially surround the nickel boron layer. Thereafter the furnace is heated to a temperature of about 2,300° F. until the components are alloyed. The chrome lump material is then added to the molten alloy with silicon as needed. This is allowed to alloy fully whereafter the molybdenum constituent is added to the melt. After a complete alloying a mixture of copper and niobium is added at the same time to the alloy and thereafter alloyed. As the final step the silicon constituent is added. The atomization furnace is heated to a temperature of about 2,500° F. and a Krupp 4a nozzle is used at an atomization pressure of 400 psi, for 26 seconds to provide a powdered filler metal which has a mesh size of +100-trace; +140 10% max; and −325 45%.

The filler metal so prepared was applied to a stainless steel 'T' specimen and was heated for five minutes at 1900° F. in a hard vacuum for brazing the 'T' shaped specimen. The sample was immersed in tap water heated to a temperature of 140° F. contained in a two liter pyrex beaker for a twenty four hour period. The brazed specimen showed no corrosion either on the surface of the braze fillet or at the diffusion layer. It was considered that this alloy would be suitable for corrosion resistant applications which repeatedly came in contact with tap water.

EXAMPLE II

A filler metal alloy was prepared in accordance with the procedure set forth in Example I but utilizing a tantalum and niobium combination. The charge percentages for this example are set forth in Table II.

TABLE II

| Element | Charge % | Weight (gms) |
|---|---|---|
| Silicon | 3.60 | 163 |
| Chromium | 5.00 | 227 |
| Boron | 2.10 | 555* |
| Copper | 1.01 | 46 |
| Molybdenum | 1.01 | 46 |
| Niobium | 1.01 | 46 |
| Tantalum | 1.01 | 46 |
| Nickel | Bal. | 3411 |
| TOTAL | | 4540 |

*NiB @ 17.17% B

The filler metal was used to braze a stainless steel 'T' specimen by heating the 'T' specimen with filler metal applied for five minutes at 1900° F. in a vacuum furnace. The sample was immersed in tap water heated to a temperature of 140° F. contained in a two liter pyrex beaker for a twenty four hour period. The resulting sample showed no corrosion either on the surface of the braze fillet or at the diffusion layer.

EXAMPLE III

A filler metal alloy was prepared in accordance with the procedure set forth in Example I but utilizing a tantalum and niobium combination. The charge percentages for this example are set forth in Table III.

TABLE III

| Element | Charge % | Weight (gms) |
|---|---|---|
| Silicon | 5.55 | 252 |
| Chromium | 9.00 | 409 |
| Boron | 4.05 | 1071* |
| Copper | — | 272 |
| Molybdenum | — | 272 |
| Niobium | 6.0 | 272 |
| Tantalum | 4.0 | 182 |
| Nickel | Bal. | 1810 |
| TOTAL | | 4540 |

*NiB @ 17.17% B

The filler metal is used to braze a stainless steel 'T' specimen with filler metal applied for five minutes at 1900° F. in a vacuum furnace. The sample was immersed in tap water heated to a temperature of 140° F. contained in a two liter pyrex beaker for a twenty four hour period. The resulting sample showed no corrosion either on the surface of the braze fillet or at the diffusion layer.

EXAMPLE IV

A filler metal alloy was prepared in accordance with the procedure set forth in Example I but utilizing a tantalum and niobium combination. The charge percentages for this example are set forth in Table IV.

TABLE IV

| Element | Charge % | Weight (gms) |
|---|---|---|
| Silicon | 4.25 | 193 |
| Chromium | 7.9 | 359 |
| Boron | 3.25 | 859* |
| Copper | 2.5 | 114 |
| Molybdenum | 2.0 | 91 |
| Niobium | 2.0 | 91 |
| Tantalum | 2.0 | 91 |

TABLE IV-continued

| Element | Charge % | Weight (gms) |
|---|---|---|
| Nickel | Bal. | 2742 |
| | TOTAL | 4540 |

*NiB @ 17.17% B

The filler metal is used to braze a stainless steel 'T' specimen by heating the 'T' specimen with filler metal applied for five minutes at 1900° F. in a vacuum furnace. The sample was immersed in tap water heated to a temperature of 140° F. contained in a two liter pyrex beaker for a twenty four hour period. The resulting sample showed no corrosion either on the surface of the braze fillet or at the diffusion layer.

EXAMPLE V

A filler metal alloy was prepared in accordance with the procedure set forth in Examine I. Charge percentages used are set forth in Table V below.

TABLE V

| Element | Charge % | Weight (gms) |
|---|---|---|
| Silicon | 3.60 | 163 |
| Chromium | 5.00 | 227 |
| Boron | 2.10 | 555* |
| Copper | 1.01 | 46 |
| Molybdenum | 1.01 | 46 |
| Niobium | 1.01 | 46 |
| Nickel | BAL. | 3457 |
| | TOTAL | 4540 |

*NiB @ 17.17% B

The filler metal is used to braze a stainless steel 'T' specimen by heating the 'T' specimen with filler metal applied for five minutes at 1900° F. in a vacuum furnace. The sample was immersed in tap water heated to a temperature of 140° F. contained in a two liter pyrex beaker for a twenty four hour period. The resulting sample showed no corrosion either on the surface of the braze fillet or at the diffusion layer.

While the above description constitutes the preferred embodiments of the present invention, it is to be appreciated that the invention is susceptible to modification, variation and change without departing from the proper scope and fair meaning of the accompanying claims.

What is claimed is:

1. A braze filler metal composition exhibiting corrosion resistance both at the boundary layer between the base metal and the filler metal and in the filler metal fillet which is substantially iron free in its composition, said composition consisting essentially of:
a nickel based alloy including from about 5% to about 9% chromium; from about 3.5% to about 5.5% silicon; from about 2.0% to about 4.0% boron and containing effective amounts of: a) from about 2% to about 12% of a fillet metal corrosion inhibiter for protecting the fillet metal from corrosion due to the diffusion of iron from the base metal into the filler metal fillet during brazing, said inhibiter being selected from the group consisting of copper molybdenum and mixtures thereof, said alloy containing at least 1% of copper; and b) from about 1% to about 6% of a diffusing carbide forming base metal protector having a higher affinity for forming carbides than chromium, said protector being for diffusion into the base metal for preferentially forming carbides which might otherwise form chromium carbides from chromium in the base metal thereby substantially reducing chromium carbide formation at the grain boundaries in the base metal and at the diffusion layer, said diffusing carbide forming base metal prohibitor selected from the group consisting of niobium, tantalum and mixtures thereof wherein said composition is substantially free of iron.

2. A braze filler metal composition exhibiting corrosion resistance to tap water both at the boundary layer between the filler metal, fillet and the base metal and at the fillet portion of the braze, consisting essentially of from about 5.0% to about 9.0% chromium; from about 3.5% to about 5.5% silicon; from about 2.0% to about 4.0% boron; from about 1.0% to about 6.0% copper; from about 1.0% to about 6.0% molybdenum; from about 1.0% to about 6.0% niobium, tantalum or mixtures thereof and the balance nickel, wherein said composition is substantially free of iron.

3. The filler metal composition of claim 2 wherein the copper constituent in said alloy is from about 2.0% to about 4.0%.

4. The filler metal composition of claim 2 wherein the molybdenum constituent further comprises from about 1.0% to about 3.0%.

5. The filler metal composition of claim 2 wherein the niobium, tantalum or mixtures thereof constituent further comprises from about 1.0% to about 3.0%.

6. A braze filler metal composition consisting essentially of:
from about 7.0% to about 9.0% chromium; from about 3.5% to about 5.5% silicon; from about 2.0% to about 4.0% boron; from about 2.0% to about 4.0% copper; from about 1.0% to about 3.0% molybdenum; from about 1.0% to about 3.0% niobium, tantalum or mixtures thereof; and the balance nickel, wherein said composition is substantially free of iron.

7. A braze filler metal composition exhibiting corrosion resistance to tap water at the fillet portion of the braze, consisting essentially of from about 5.0% to about 9.0% chromium; from about 3.5% to about 5.5% silicon; from about 2.0% to about 4.0% boron; from about 1.0% to about 6.0% copper; from about 1.0% to about 6.0% molybdenum; from about 1.0% to about 6.0% niobium, tantalum or mixtures thereof and the balance nickel, wherein said composition is substantially free of iron, wherein the copper and molybdenum constituents act to protect the braze metal fillet of a finished braze even in the presence of diffused iron and the niobium constituent acts to diffuse into the base metal for forming sacrificial niobium carbides thereby protecting the chromium of the base metal from forming undesirable chromium carbides.

* * * * *